United States Patent [19]

Muhlfelder et al.

[11] 4,062,509
[45] Dec. 13, 1977

[54] CLOSED LOOP ROLL/YAW CONTROL SYSTEM FOR SATELLITES

[75] Inventors: Ludwig Muhlfelder, Livingston; George Edwin Schmidt, Jr., Delran, both of N.J.

[73] Assignee: RCA Corporation, New York, N.Y.

[21] Appl. No.: 640,147

[22] Filed: Dec. 12, 1975

[30] Foreign Application Priority Data

July 21, 1975   United Kingdom ............... 30390/75

[51] Int. Cl.² .............................................. B64G 1/10
[52] U.S. Cl. .................................... 244/166; 364/434; 244/3.2
[58] Field of Search ................... 73/178 R; 235/150.2; 244/3.2, 164–166, 171; 318/584, 585

[56] References Cited

U.S. PATENT DOCUMENTS

| | | | |
|---|---|---|---|
| 3,232,561 | 2/1966 | Adams | 244/166 |
| 3,429,524 | 2/1969 | Buckingham et al. | 244/166 |
| 3,575,362 | 4/1971 | Hammond et al. | 244/3.2 |
| 3,765,621 | 10/1973 | Shigehara | 244/166 |
| 3,834,653 | 9/1974 | Perkel | 244/166 |
| 3,866,025 | 2/1975 | Cavanagh | 235/150.2 |

Primary Examiner—Stephen G. Kunin
Attorney, Agent, or Firm—Edward J. Norton; M. Christoffersen; Joseph D. Lazar

[57] ABSTRACT

Attitude of a pitch momentum biased satellite in a low inclination orbit is controlled by a closed loop magnetic torquing control system. A magnetic dipole oriented perpendicular to the satellite's pitch axis in the roll/yaw plane and at a predetermined azimuth angle relative to the roll axis minimizes roll and yaw errors by interaction with the earth's magnetic field. Signals from an on-board roll attitude sensor are used by satellite mounted detection and driver circuits to control the compensating torques. Magnetic torquing is initiated whenever the roll error as measured by the roll attitude sensor exceeds a predetermined threshold.

4 Claims, 6 Drawing Figures

CLOSED LOOP ROLL/YAW CONTROL SYSTEM FOR SATELLITES

BACKGROUND OF THE INVENTION

1. Field of the Invention

This invention relates to attitude control for pitch momentum biased satellites in low inclination orbits, and more particularly, to control of the roll and yaw axes by automatic magnetic torquing in a closed loop system.

2. Description of the Prior Art

A stabilized orbiting satellite requires a means for changing its attitude when it has deviated from its desired orientation or position relative to its orbit.

Magnetic torquing of dual-spin stabilized satellites is known. Such magnetic torquing systems use a magnetic field produced by torquers such as current carrying coils or electromagnets to interact with the magnetic field of the earth to develop a reaction torque. This reaction torque causes the reference axis of the satellite to be repositioned an amount proportional to the torquing time and flux magnitude as is well known in the art.

One closed loop system for controlling the attitude of a satellite having a single inertia wheel mounted on an axis coinciding with the satellite's pitch axis is described in U.S. Pat. No. 3,429,524 issued Feb. 25, 1969 to Westinghouse Electric Corporation, based on the invention of Arthur Buckingham and Thomas Haney entitled "Attitude Control System." The system described therein achieves roll and yaw control by an electromagnetic actuation system which comprises three mutually perpendicular magnetic torquing coils in combination with a three axis magnetometer and both roll and yaw error sensing means. The three axis magnetometer is used to measure the components of the earth's magnetic field in the principal axes of the vehicle. If a roll angle error is sensed by the roll attitude sensing means, an IR horizon sensor, a corrective torque is generated about the yaw axis by energizing the current carrying coils on the pitch and roll axes. Similarly if a yaw angle error is sensed by the yaw attitude sensing means, a corrective torque is generated about the roll axis by energizing the current carrying coils on the pitch and yaw axes. In both instances, on-board computer units, one for each of the satellite's three axes, operate under the conjoint action of the IR sensor, the yaw angle sensor, and the three axis magnetometer to cause the generation of currents which develop the magnetic fields of the torquing coils.

Another closed loop system for controlling roll and yaw error in an orbiting pitch momentum biased satellite is described in U.S. Pat. No. 3,834,653 issued Sept. 10, 1974, to RCA Corporation, based on the invention of Harold Perkel entitled "Closed Loop Roll and Yaw Control and Satellites." The system described therein achieves control by using the sensed errors in roll as the only control input parameter of the closed-loop system. By taking advantage of the gyroscopic properties of the satellite the system obviates the need for a yaw sensor and for an independently stimulated corrective torque about the roll axis in response to the yaw sensor. A magnetic dipole oriented along the roll axis for a satellite in a synchronous or low inclination orbit interacts with the primary magnetic field which is perpendicular to the orbit plane to produce a magnetic control torque about the yaw axis when the roll attitude exceeds a predetermined threshold level. Attitude sensors in combination with electronic logic energize the dipole with currents of appropriate polarity and magnitude to effect the necessary torque to correct the satellite's attitude. Because of gyroscopic cross-coupling between the roll and yaw axes, the control torque causes procession about the roll axis which cancels out the roll errors. Thus, the magnetic torquer directly reduces the roll error and by the gyroscopic cross-coupling indirectly controls the yaw error.

As is well known in the art for such an earth oriented spacecraft, yaw errors are not sensible by earth sensors. Further, roll and yaw errors interchange sinusoidally on approximately a quarter orbit basis throughout the orbit for such a momentum biased spacecraft because of the inertial stiffness of the momentum vector.

In the Perkel system described in the aforesaid patent, a threshold value is typically established for the roll error such that the magnetic dipole is energized only when the roll error exceeds the threshold value. When the roll error is reduced to zero, the torquer is cut off or de-energized. In order to improve the attitude precision in a low inclination orbit, momentum biased spacecraft using the Perkel system, the roll torquing threshold must be lowered. Although lowering of the roll threshold is apparently beneficial to roll precision, the yaw damping which provides the aforementioned indirect control of yaw motion, diminishes. This loss of yaw damping can result in a large yaw build-up and even in a deterioration of roll performance due to the additional disturbance produced by the gyroscopic coupling of the large amplitude yaw errors into roll.

Accordingly, a system for directly minimizing both roll and yaw errors to achieve higher attitude control precision in the absence of a yaw sensing means and an independently stimulated roll torquing means is needed to overcome the deficiencies discussed above of the presently known systems.

SUMMARY OF THE INVENTION

According to the present invention, a closed loop control system for aligning the pitch axis of a momentum biased satellite in a low inclination orbit with the orbit normal includes a magnetic torquing means which is energized with currents of appropriate polarity and magnitude to effect the necessary torque to minimize directly both roll and yaw errors. The torquing means is oriented such that it is on an axis which is perpendicular to the spacecraft's pitch axis in the roll/yaw plane and at a predetermined azimuth angle relative to the roll axis. Sensor means generate signals which are proportional only to the roll error of the satellite. The sensor means output signals are passed to a threshold detector where they are compared to a control torquing threshold. When the threshold, which may be zero, is exceeded, the magnetic torquer is energized so as to effect the required torquing flux.

DESCRIPTION OF THE PREFERRED EMBODIMENT

Figure 1A:
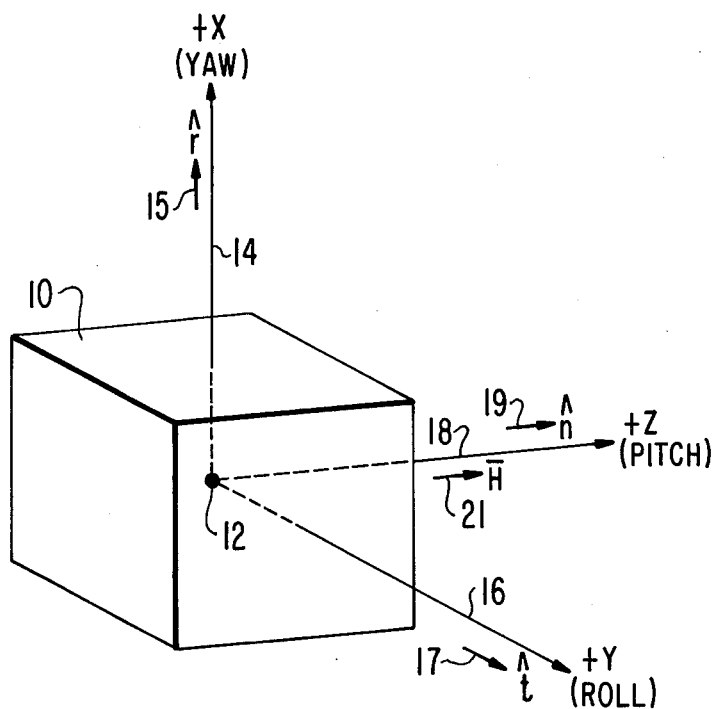
FIG. 1a is a schematic diagram of a satellite showing the three axes thereof as related to the momentum vector.

Referring to FIG. 1, there is shown a body 10 which may be a satellite or spacecraft of any suitable or desired shape. Extending from the center of mass 12 of the spacecraft are three mutually perpendicular body axes, X, Y, and Z designated as 14, 16, 18 corresponding to the conventionally designated yaw, roll, and pitch axes, respectively. Also shown are three local orbital reference unit vectors $\hat{r}$, $\hat{t}$, and $\hat{n}$ designated as 15, 17, 19. Each unit vector is aligned with one of the spacecraft's three body axes when the spacecraft is in its nominal orientation relative to its orbit, where $\hat{r}$ 15 is the unit vector aligned with the nominal yaw axis 14, $\hat{t}$ 17 is the unit vector aligned with the nominal roll axis 16, and $\hat{n}$ 19 is a unit vector along the positive orbit normal, aligned with the pitch axis 18.

The pitch (Z) axis 18 is defined to be that direction in the spacecraft 10 collinear with the total angular momentum vector $\overline{H}$ designated as 21 and the normal to the orbit plane when the spacecraft 10 is operating in its intended mission orientation. The pitch axis 18 is parallel to the axis about which a momentum wheel is rotated. The sign convention is that the pitch axis 18, shown in FIG. 1, is positive and is in the direction of the positive angular momentum vector 21. Thus, according to the usual convention in this art, the angular momentum possessed by the spacecraft 10 is equivalent to having the body 10 spinning counter clockwise about the pitch axis. The yaw and roll axes 14, 16 are mutually perpendicular and orthogonal to the pitch axis. The axis system as defined and used herein according to the usual convention is right handed in the order X-Y-Z. The Z axis 18 shall at all times be referred to herein as the pitch or spin axis. The Z axis is parallel to the axis of the spinning (momentum) wheel.

For the purposes of describing one embodiment of the present invention, the momentum vector $\overline{H}$ is assumed to be collinear with the pitch axis 18. Further the pitch axis is normal to the plane of the orbit of the satellite.

An orbiting satellite which has stored angular momentum can be oriented in such a way that the direction, defined by the angular momentum vector $\overline{H}$ (FIG. 1), is aligned with the orbit normal, by an automatic means, according to the invention, which includes conventional torquers, sensors, and electronic logic circuits in a closed-loop without the need of ground control command.

Figure 1B:
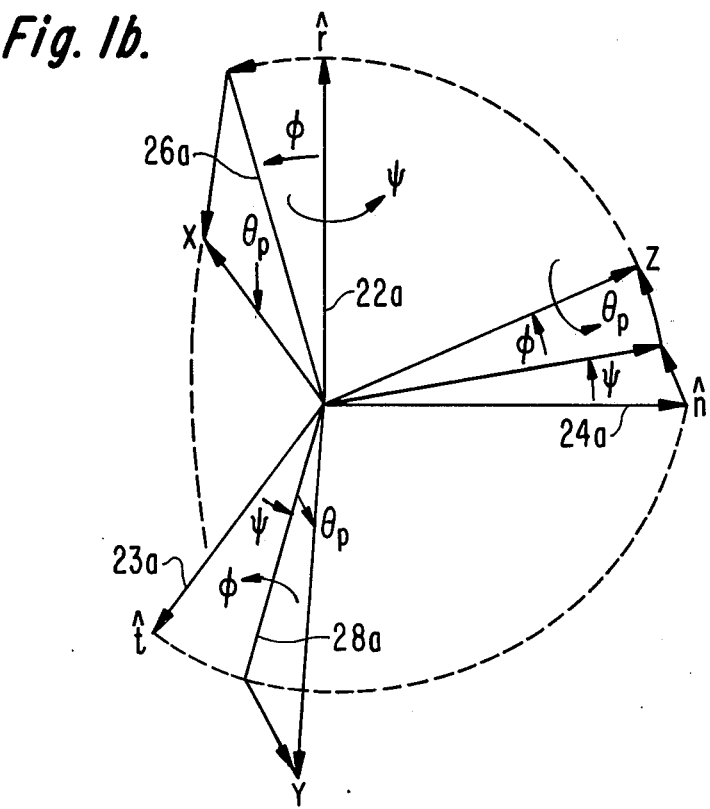
FIG. 1b is a diagram showing the axes in inertial conventions related to the orbit normal.

Referring now to FIG. 1b there is shown a diagram of several of the parameters that will be used in the description to follow of one form of the invention. The X, Y, and Z axes described above with respect to FIG. 1b, it being understood that these axes are identical to the axes heretofore described. The local vertical vector or direction 22a is collinear with the desired reference direction for orienting the spacecraft yaw axis (14). The vector 24a indicates the direction perpendicular to the orbit plane of the spacecraft. The line 26a represents the position of the yaw axis if the spacecraft were to have a yaw angle $\psi$ (psi) and a roll angle $\phi$ (phi) but no pitch angle $\theta_p$ (theta) relative to the orbital coordinates 22a, 24a, and 23a. The line 28a similarly represents the position of the roll axis, with a yaw angle $\psi$ and a roll angle $\phi$, but no pitch angle $\theta_p$. The angles as shown by the several vectors and directions are defined as follows.

$\theta_p$ is the spacecraft pitch error, defined as the angle between the yaw axis and the plane formed by the pitch axis and the local vertical 22a;

$\phi$ is the spacecraft roll angle defined as the angle between the pitch axis and the plane formed by the orbit normal 24a and velocity vector 23a;

$\psi$ is the spacecraft yaw angle defined as the angle between the orbit normal 24a and the plane defined by the pitch axis 18, and the local vertical 22a.

The practice of this invention depends on the property of a spinning satellite which is essentially a gyroscope. One property of a gyroscopically stabilized spacecraft is that the direction of its spin axis in space cannot move unless deliberately torqued.

Since roll and yaw interchange sinusoidally throughout the orbit for such a spin oriented spacecraft, the position of the spin axis is uniquely determined without the necessity of direct yaw measurement, which is most difficult for an earth oriented spacecraft.

According to the invention, the error in roll is used as the only control input parameter of the closed loop system as will be described.

Figure 2:
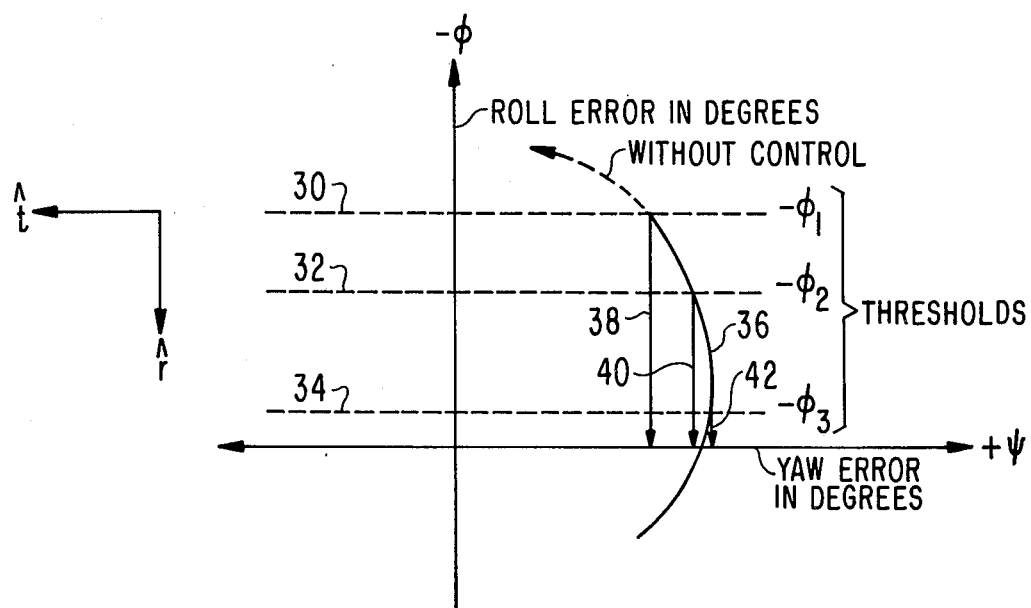
FIG. 2 is a diagram of the projection of the pitch axis trajectory in the local orbital roll/yaw plane under roll/yaw control for a magnetic dipole oriented along the roll axis.

Referring to FIG. 2 there is shown a locus diagram of the projection of the spacecraft's momentum vector in the nominal roll/yaw plane. In the absence of disturbing torques, the momentum vector is perpendicular to the nominal roll/yaw plane, and therefore, there is no projection of the vector in that plane. As a result of disturbance torques caused by solar pressure, gravity gradient, or residual spacecraft magnetic dipoles acting either alone or in combination the momentum vector is precessed from its position normal to the nominal roll/yaw plane thereby causing spacecraft roll and yaw errors. The projection of the precessed momentum vector in the nominal roll/yaw plane describes the path designated as 36 which in the absence of control torques, is a spiral of ever increasing radius. Only a portion of that spiral has been shown in FIG. 2.

Three roll error thresholds designated as $-\phi_1$ (30), $-\phi_2$ (32), and $-\phi_3$ (34) are shown in FIG. 2 in order to illustrate the effect on both roll and yaw error of magnetic torquing by a dipole oriented parallel to the roll axis which creates nominally a yaw torque. The thresholds represent the amount of roll error in degrees that is allowed to occur in the spacecraft before magnetic torquing is initiated. When the threshold is set at 30, the effect of magnetic torquing by the dipole oriented parallel to the roll axis, is to decrease both roll and yaw error as indicated by path 38. When the threshold is lowered to 32, the effect of magnetic torquing as indicated by path 40 is to still decrease both the roll and yaw error although the amount of decrease of both errors is less than that which occurred when the threshold was set at 30. If the roll threshold is further decreased to 34, the effect of the magnetic torquing as indicated by path 42 is to decrease the roll error but to increase the yaw error. Therefore, with the magnetic torquer oriented parallel to the roll axis, a decreasing roll threshold can result in a build up of yaw error which can eventually lead to a deterioration of roll performance due to the additional disturbance produced by the gyroscopic coupling of the large amplitude yaw errors into roll.

Figure 3:
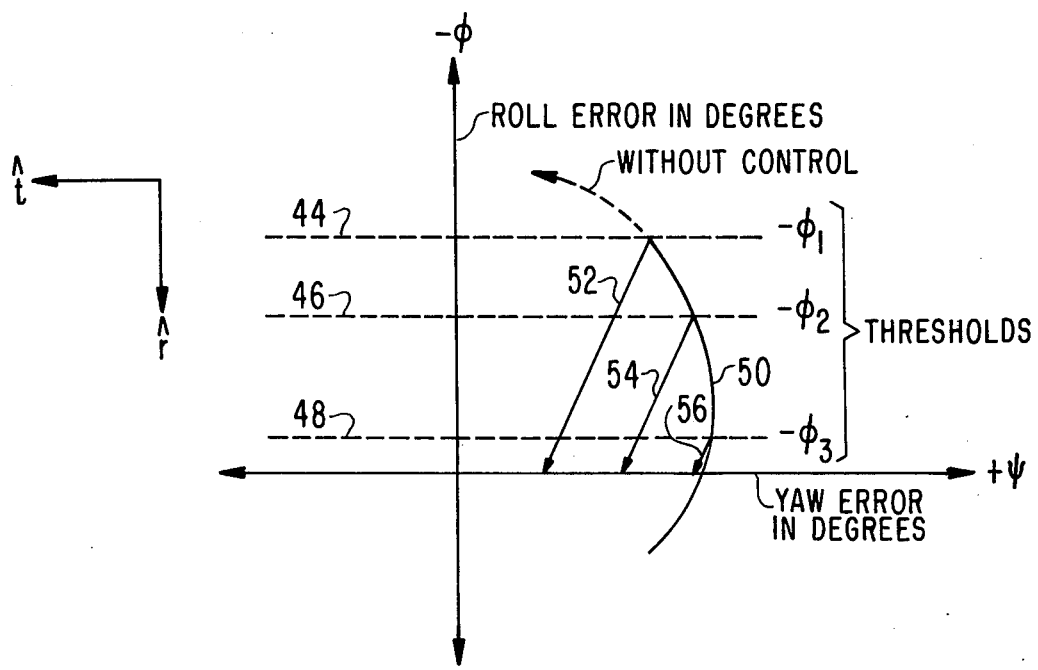
FIG. 3 is a diagram of the projection of the pitch axis trajectory in the local orbital roll/yaw plane under roll/yaw control for a magnetic dipole oriented in the roll/yaw plane.

Referring now to FIG. 3, there is also shown a projection of the spacecraft's momentum vector in the nominal roll/yaw plane in the presence of disturbing torques. The path 50 which is described by the projection is a spiral and for purposes of comparison is identical to the path 36 (FIG. 2). The thresholds for roll error which are indicated in FIG. 3, $-\phi_1$ (44), $-\phi_2$ (46), $-\phi_3$ (48) are also identical to the thresholds 30, 32, and 34 respectively of FIG. 2.

According to the present invention, a magnetic torquer is oriented in the satellite to produce a magnetic dipole perpendicular to the satellite's pitch axis and in the plane formed by the roll and yaw axes. The dipole is located in the plane at a predetermined azimuth angle relative to the roll axis. The effect of such an orientation of the magnetic dipole can be seen by examining FIG. 3 for the various roll thresholds and comparing the result of magnetic torquing to that shown in FIG. 2 for the same threshold. With the roll error threshold set at 44, the effect of magnetic torquing by the skewed dipole is shown by path 52. A comparison of path 52 of FIG. 3 with path 38 of FIG. 2 indicates that the skewed dipole for the same roll threshold ($-\phi_1$) has produced a far greater decrease in both roll and yaw error then is provided by the magnetic dipole located parallel to the roll axis. Similarly for the $-\phi_2$ and $-\phi_3$ roll thresholds it is seen from a comparison of FIGS. 2 and 3 that the skewed dipole as indicated by paths 54 and 56 provides better compensation for roll and yaw errors than is provided by the dipole oriented parallel to the roll axis. It should be noted that when the threshold is diminished to $-\phi_3$ the skewed dipole provides both roll and yaw attenuation as indicated by path 56 whereas the dipole oriented parallel to the roll axis as shown by path 42 of FIG. 2 causes a divergence of yaw error. Therefore the skewing of the control dipole in the roll/yaw plane allows for a lowered roll threshold, indeed, as low as zero, and greater spacecraft precision as compared to the dipole oriented parallel to the yaw axis.

Figure 4:
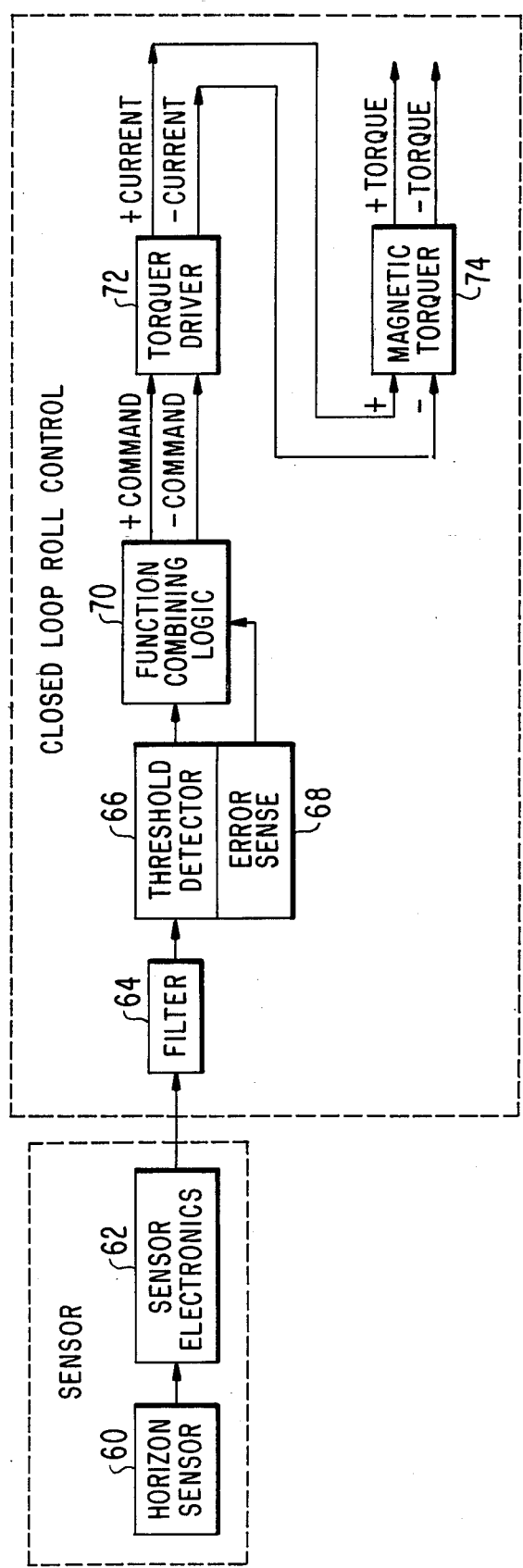
FIG. 4 is a block diagram of a closed loop roll/yaw control system illustrating one form of the invention.

Referring to FIG. 4, there is shown a block diagram illustrating one embodiment of the invention. An attitude sensor such as a horizon sensor 60 suitably located on satellite 10 responds to energy from the earth's surface. The attitude sensor may be arranged in any suitable manner known in the art. Typically a pair of sensors may be arranged to scan the horizon in a V configuration. Sensor electronics 62 is suitably arranged to generate in response to the signals from horizon sensor 60 a signal proportional to the roll error $\phi$ of the satellite. As stated above, the roll error of the satellite represents the misalignment between the angular momentum axis (11) and the plane formed by the velocity vector and the orbit normal (FIG. 1b). Depending upon the specific implementation of horizon sensor 60 and/or sensor electronics 62, the output signal from the sensor electronics could be either an analog waveform or digital words.

The output signal from sensor electronics 62 is filtered by an electronic or digital filter 64 to reduce noise. Threshold detector 66 compares the filtered output signals to a given threshold level. The threshold level is dependent upon the degree of attitude precision which is required in the satellite. In some applications, a zero threshold level may even be required. Threshold detector 66 of the conventional design includes circuitry for generating and maintaining an output signal when the roll error exceeds the given threshold level. The output signal from detector 66 is maintained until the roll error changes sign. The change in sign indicates that the control torque developed by torquer 74 has minimized the roll error. If the roll error is greater than the predetermined threshold level, the sense of the magnetic dipole that is developed by the control torquer 74 is determined by the error sensor 68. The error sense which is indicated by error sensor 68 determines the sense of the current that should flow through the magnetic torquer so as to produce the desired control torque. For example, where horizon sensor 60 is embodied as a pair of sensors in a V configuration, the error sensor 68 indicates which of the sensor outputs precedes the other, thereby indicating the sense of the roll error. For this type of horizon sensor, error sensor 68 is a suitable phase detector which compares the two output signals from the sensor.

Logic circuit 70 responsive to the output signals from both threshold detector 66 and error sensor 68 indicates to driver circuit 72 the appropriate polarity and magnitude of current to energize torquer 74 such that the roll error is minimized. Driver circuit 72 typically comprising either a current or a voltage source is suitably arranged to generate in response to the signals from logic circuit 70 signals determining the appropriate current polarity for magnetic torquer 74. The magnetic torquer 74 may be a single unit such as core coil or electromagnet, or due to mounting considerations an array of units that produce magnetic dipoles whose vector sum results in the desired dipole magnitude and direction. Therefore, the sense of the current flowing through magnetic torquer 74 is determined by the sense of the filtered roll error signal.

Figure 5:
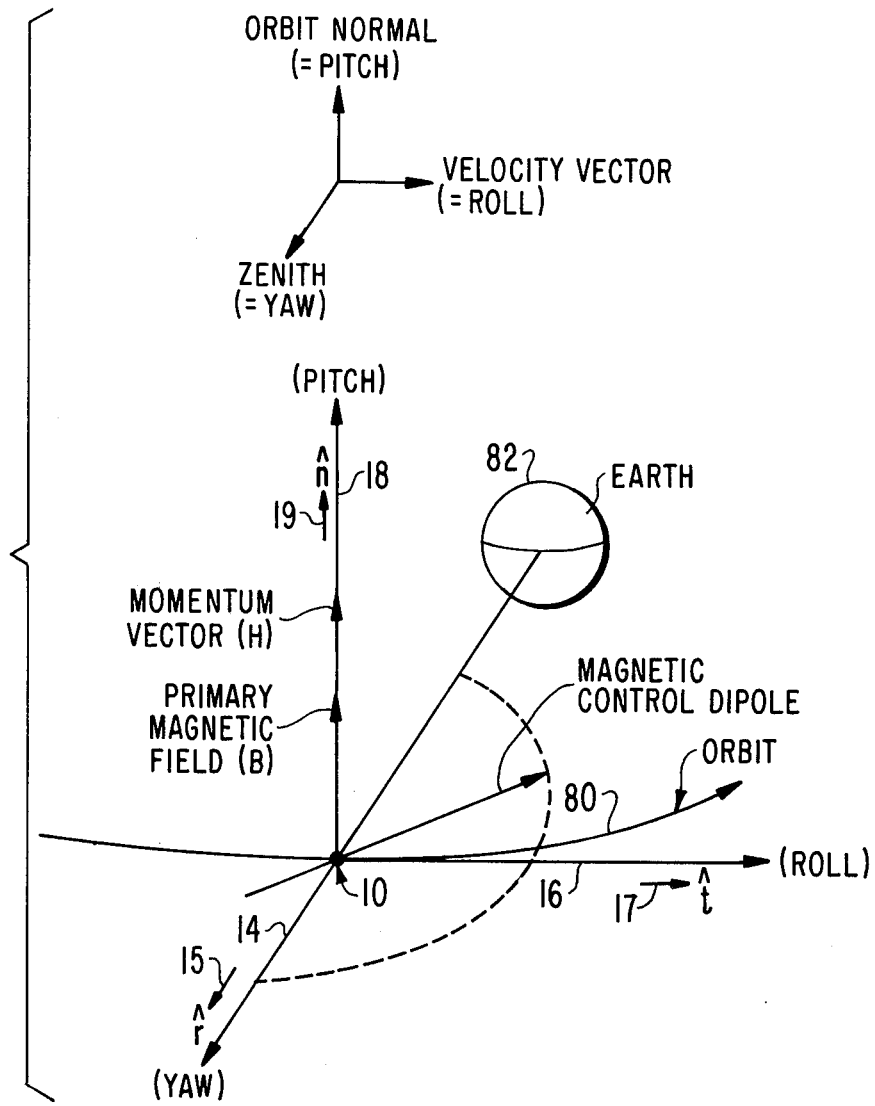
FIG. 5 is a diagram showing the vector relationships concerned with the mechanical controls relating to the invention.

The diagram illustrated in FIG. 5 shows in another form the vector relationship of the various forces and torques that are of concern to a satellite using the invention. The diagram illustrates the satellite 10 in a synchronous altitude orbit 80 about the earth 82. The orbit is approximately equatorial. For a satellite at synchronous altitude the earth's magnetic field B is substantially parallel to the orbit normal. The magnetic torquer 74 which is located on the satellite orthogonal to the pitch axis in the roll/yaw plane generates a magnetic dipole which has components either along the + roll and − yaw axes or − roll and + yaw axes for the coordinate system shown. The interaction of the magnetic dipole for the components described above with the earth's magnetic field provides the magnetic control torques either along the + roll and + yaw axes or − roll and − yaw axes which are used to minimize the satellite's roll and yaw error.

According to a computerized model, calculations of roll threshold, dipole field strength, and the location of the dipole in the roll/yaw plane were made for a specific pitch momentum biased satellite in a low inclination orbit. The input parameters used in this computer model were the earth's magnetic field, the orbit configuration, the various disturbance torques that the spacecraft would be subjected to and the spacecraft momentum. Disturbance torques may arise from either solar pressure, gravity gradient, or residual spacecraft magnetic dipoles acting individually or in combination with each other. These disturbance torques can be taken into account by specifying spacecraft surface properties and mass properties to represent the effect of solar pressure and gravity gradient torques respectively and by specifying a dipole component on each spacecraft body axis to represent the effect of the torques due to the residual magnetic dipoles.

The skewed dipole and various orientations for that dipole were then placed into the computer model. The magnitude and direction of the dipole are then varied in order to determine the best orientation for the dipole in the roll/yaw plane.

The computer model shows that for this specific pitch momentum biased satellite and mission, the roll threshold can be set at 0.02°, the dipole field strength is 90.0 Atm$^2$ and the dipole should be oriented in the roll/yaw plane along an axis which is rotated 70° from the positive roll axis toward the negative yaw axis.

What is claimed is:

1. A closed loop magnetic torquing system for an orbiting pitch momentum biased satellite in a low inclination orbit for automatically controlling the roll error and yaw error of the satellite whereby the pitch axis is oriented to a desired attitude, said pitch axis being collinear with the momentum vector of the satellite, comprising:

a closed loop consisting essentially of:
 a. roll error sensing means for generating an output signal representing a deviation of the pitch axis from said desired attitude,
 b. magnetic torquing means oriented in said satellite to produce a magnetic dipole in the plane formed by said satellite's roll and yaw axes, said dipole being perpendicular to said satellite's pitch axis, and located in said plane at a predetermined azimuth angle relative to said roll axis,
 c. means coupled to said sensor means for detecting when said sensor output signal exceeds a predetermined roll error threshold for generating an output signal when said threshold is exceeded and for maintaining said output signal until said sensor output signal changes sign; and
 d. energizing means coupled to said detecting means and responsive/ to said detecting output signal for energizing said magnetic torquing means such that the magnetic field therefrom reacts with the magnetic field of the earth to produce a magnetic torque so that both the roll and yaw errors are attenuated to correct thereby the deviation of said pitch axis to change the orientation of said momentum vector without substantially changing the magnitude of said momentum vector.

2. A system according to claim 1 wherein said torquing means further comprises first torquing means oriented along an axis parallel to said satellite's roll axis, and second torquing means oriented along an axis parallel to said spacecraft's yaw axis such that the vector sum of the magnetic dipoles produced by said first and second torquing means is located at a predetermined azimuth angle relative to said roll axis.

3. A system according to claim 1 wherein said energizing means includes means to determine the sense of the magnetic field generated by said torquing means to correspond to the sense of the earth's magnetic field.

4. A system according to claim 1 wherein said satellite is of the dual-spin type having a momentum wheel, and said error sensing means comprises a pair of horizon sensors oriented to scan the earth's surface on opposite sides of the local vertical.

* * * * *